United States Patent [19]

Guyot et al.

[11] 4,169,383

[45] Oct. 2, 1979

[54] PROCESS AND A DEVICE FOR THE INDICATION OF THE EXTENT OF UNBALANCE OF A PART TO BE BALANCED

[75] Inventors: Volker Guyot, Buettelborn; Otfrid Maus, Darmstadt; Martin Müller, Bickenbach, all of Fed. Rep. of Germany

[73] Assignee: Carl Schenck AG, Darmstadt, Fed. Rep. of Germany

[21] Appl. No.: 903,478

[22] Filed: May 8, 1978

[30] Foreign Application Priority Data

Jun. 1, 1977 [DE] Fed. Rep. of Germany ....... 2724657

[51] Int. Cl.$^2$ ............................................. G01M 1/22
[52] U.S. Cl. .................................................... 73/462
[58] Field of Search .................... 73/462, 464; 364/463

[56] References Cited

U.S. PATENT DOCUMENTS 3,732,737  5/1973  Forster .................................. 73/462

*Primary Examiner*—James J. Gill
*Attorney, Agent, or Firm*—Connolly and Hutz

[57] ABSTRACT

The invention relates to a process and a device for the digital indication of the extent of unbalance of a part to be balanced in at least one plane when measuring its unbalance in balancing machines. An alternating voltage corresponding to the extent of unbalance is supplied to an integrator. A reference voltage is supplied to cancel out the output voltage of the integrator. While the integrator is being returned to zero, pulses are supplied to a counter which is thereby actuated to display the extent of the unbalance in digital form.

12 Claims, 5 Drawing Figures

PROCESS AND A DEVICE FOR THE INDICATION OF THE EXTENT OF UNBALANCE OF A PART TO BE BALANCED

BACKGROUND OF THE INVENTION

German published Patent Application No. DT-OS 23 57 505 discloses a balancing machine, wherein a peak value of the unbalance oscillation is utilized for the digital indication of the extent of unbalance in order to derive therefrom a digital display of the extent of the unbalance. Disadvantageous here due to disturbing voltages which superimpose the unbalance voltage, the peak value is affected by errors and thus an exact indication of the extent of unbalance cannot be accomplished.

A device has also become known from published German Patent Application DT-AS 21 07 790 wherein the peak value of the unbalance voltage is employed for the digital representation of the extent of unbalance. Here, too, the same disadvantages are present as already mentioned with regard to the above-stated German Patent Application DT-OS 23 57 505.

From DT-AS 16 48 366 is known a balancing device, particularly for motor vehicle tires, wherein the angle of the unbalance is indeed digitally displayable; however, in view of the magnitude, an analog indication is applied and auxiliary means are required, furthermore, which necessitate a very long time constant.

Emanating from this state of the art, the object of the present invention is to propose a process and a device by means of which the extent of an unbalance is freed of interference voltages and may quickly be indicated.

SUMMARY

This object is solved according to the invention in that an alternating voltage corresponding to the unbalance is supplied via a switch to an integrator by means of a delayless, non-linear input circuit, during at least one revolution of the part to be balanced. After this (these) measuring revolution(s), a reference voltage is supplied to the integrator until the integrator output voltage is returned thereby to zero. During this return time, pulses are supplied by an incremental transmitter to a counter whose ultimate count represents the extent of the unbalance. By means of this novel process, it is achieved that the interference voltages superimposing the unbalance voltage may be made ineffective and that, furthermore, as a result of which, a digitally indicated unbalance magnitude-measuring count is achieved after a single measuring revolution in the simplest construction.

An advantageous embodiment of the invention consists of effecting a calibration of the digital indication by varying the reference voltage. By changing the reference voltage, the calibration may be effected into optional units. A further preferred embodiment of the subject matter of the invention consists of making the measuring sensitivity switchable in corresponding steps by the selection of a number of measuring revolutions. It is achieved thereby that by simple means, a very high measuring sensitivity is effected.

In a further development of the idea of the invention, for the indication of the unbalance vector, it is suggested that by means of the non-linear input circuit, a filtering and a rectification result. In yet a further development of the invention, it has been shown to be particularly advantageous for the indication of the unbalance in components that by means of the non-linear input circuit, a multiplication of the unbalance signal results with a sine-shaped reference signal, which is delivered by an angular position transmitter. In yet a further development of the inventive subject matter, it is suggested for the indication of the unbalance in components that in the non-linear input circuit there be carried out a rectification controlled by the angular position transmitter. By these developments of the subject matter of the invention, there is achieved a very advantageous and simple adaptation thereof to the given measurement problems, be it for the measuring of the unbalance vector or be it for the measuring of the unbalance in components of the vector.

For the carrying out of the novel process, particularly suitable has been the development of a balancing machine with vibration pick-up, angular position transmitter, and a plane separating circuit, which is characterized in that the signals emanating from the vibration pick-up, separated in the plane circuit, are supplied to a non-linear input circuit each, the output signals of which are supplied to an integrator. A reference voltage is supplied to the integrator and pulses from a digital angular position transmitter are supplied to a counter. A particularly advantageous development of the device is distinguished in that the reference voltage source delivers at least two direct voltages, one of which optionally, may be connected with an input of the integrator. It is achieved thereby that the unbalance values to be indicated may be read in calibrated magnitudes.

In yet a further development of the subject matter of the invention, it is suggested that a switch with several outputs be connected with a revolution counter, which determines the number of the measuring revolutions. A particularly precise measuring range switching is made possible thereby.

In yet a further development of the subject matter of the invention, for the indication of the unbalance vector, it is suggested that the non-linear input circuit consist of a filter amplifying means with a rectifying circuit connected therewith. For the indication of the unbalance in components, it is suggested as a continued development of the subject matter of the application that the non-linear input circuit be a multiplier to the one input of which the unbalance signals are supplied and to the other input of which a sine voltage is supplied, which is delivered by the angular position transmitter.

As another particularly preferred embodiment of the subject matter of the invention for the indication of the unbalance in components, it is suggested that the non-linear input circuit be an electronic switch which is actuated by the signals from the angle transmitter.

The invention may be utilized with particular advantage in wheel balancing machines, wherein the extent of unbalance is indicated in a polar manner. However, if the indication in components is desired, the invention may be utilized without difficulty in other balancing machines without inventive intervention. Furthermore, the subject matter of the invention may also be utilized for a single as well as multiplane balancing, whereby individual elements may be used together, e.g. multiplex.

BRIEF DESCRIPTION OF THE DRAWINGS

Novel features and advantages of the present invention will become apparent to one skilled in the art from a reading of the following detailed description in conjunction with the accompanying drawings wherein similar reference characters refer to similar parts and in which.

DESCRIPTION OF THE PREFERRED EMBODIMENTS

Figure 1:
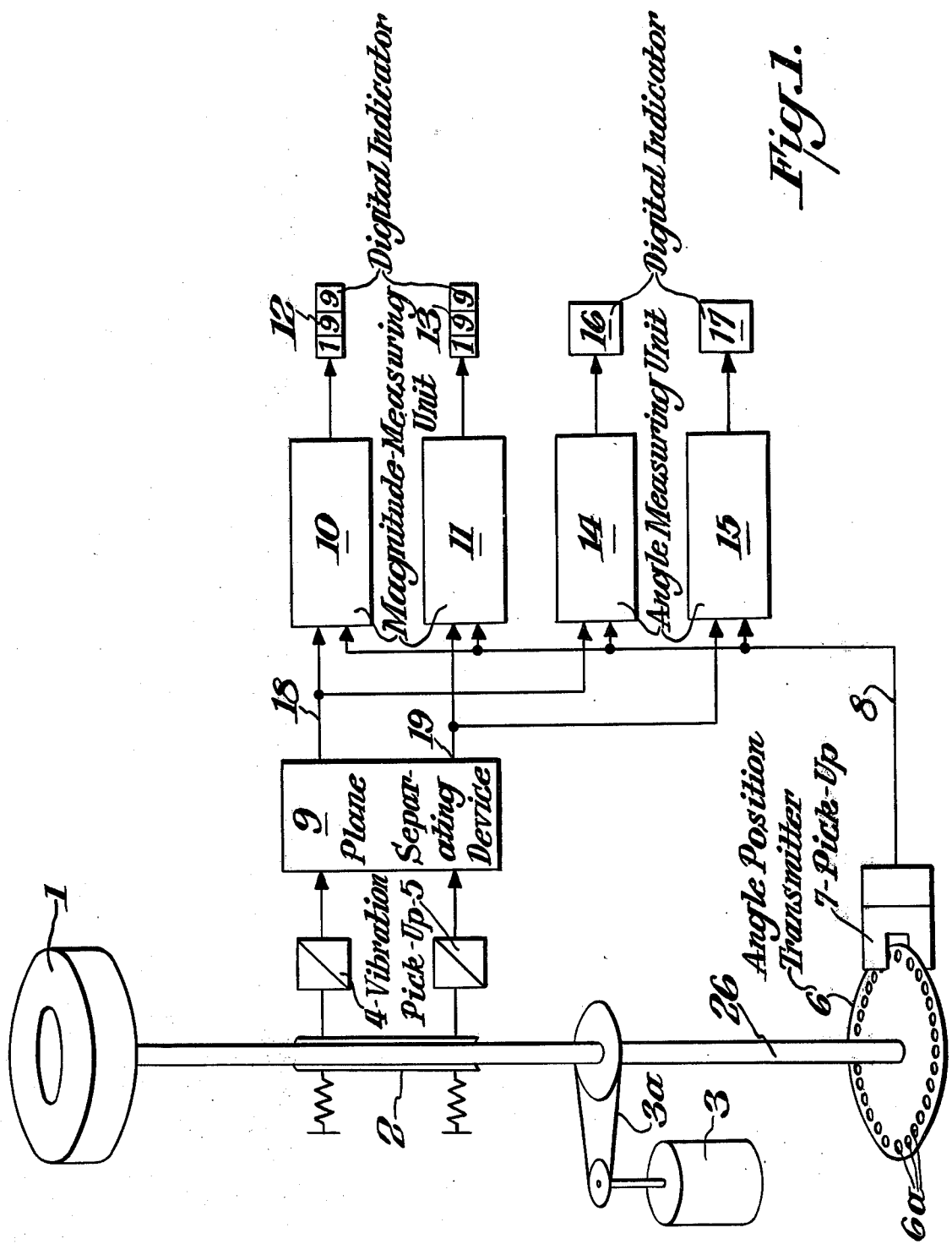
FIG. 1 is a schematic block diagram showing the subject matter of one embodiment of the invention in conjunction with a wheel balancing machine.

In the block schematic according to FIG. 1, there are displayed in schematic representation the essential structural units of a balancing machine and for the carrying out of the process, the required further structural units. A shaft 26 supports on its one end a part 1 to be balanced in two planes, such as a schematically illustrated automobile tire, while at the other end of the shaft 26 there is connected a perforated disk 6 with perforations 6a as the increment transmitter. In place of increment transmitter 6, 6a and a pick-up 7, any clock generator, such as a multivibrator or crystal oscillator may be employed. Shaft 26 is driven by motor 3 and a belt and pulley drive 3a, so that from vibration pick-ups 4 and 5, the movements of a vibratable support 2 occurring as a result of an influencing unbalance, may be picked-up. The unbalance information thus obtained is supplied by means of plane separating circuit 9 for one plane over an electrical conduit 18 to a magnitude-measuring unit 10, which is connected with a digital indicator 12 for the unbalance magnitude and for another thing is supplied to an angle-measuring unit 14, which is connected with a digital indicating device 16 for the angle. To the magnitude-measuring unit 10 is supplied from increment transmitter 6 by way of pick-up 7 further information by way of electrical conduit 8, which is also joined to the angle-measuring unit 14. For the other plane, in a manner analogous to that described above, there are connected by electrical conduit 19 a magnitude-measuring unit 11 with a indicator 13 for the unbalance magnitude and, similarly, an angle-measuring unit with a digital indicator 17 for the angle indication. The pulses coming from the increment transmitter are also supplied by means of electrical conduit 8 to the magnitude-measuring unit 11 and to the angle unit 15. The digital magnitude-measuring units 10 and 11 between themselves, are constructed similarly. Angle-measuring units 14 and 15, between themselves, are also similarly constructed.

Figure 2:
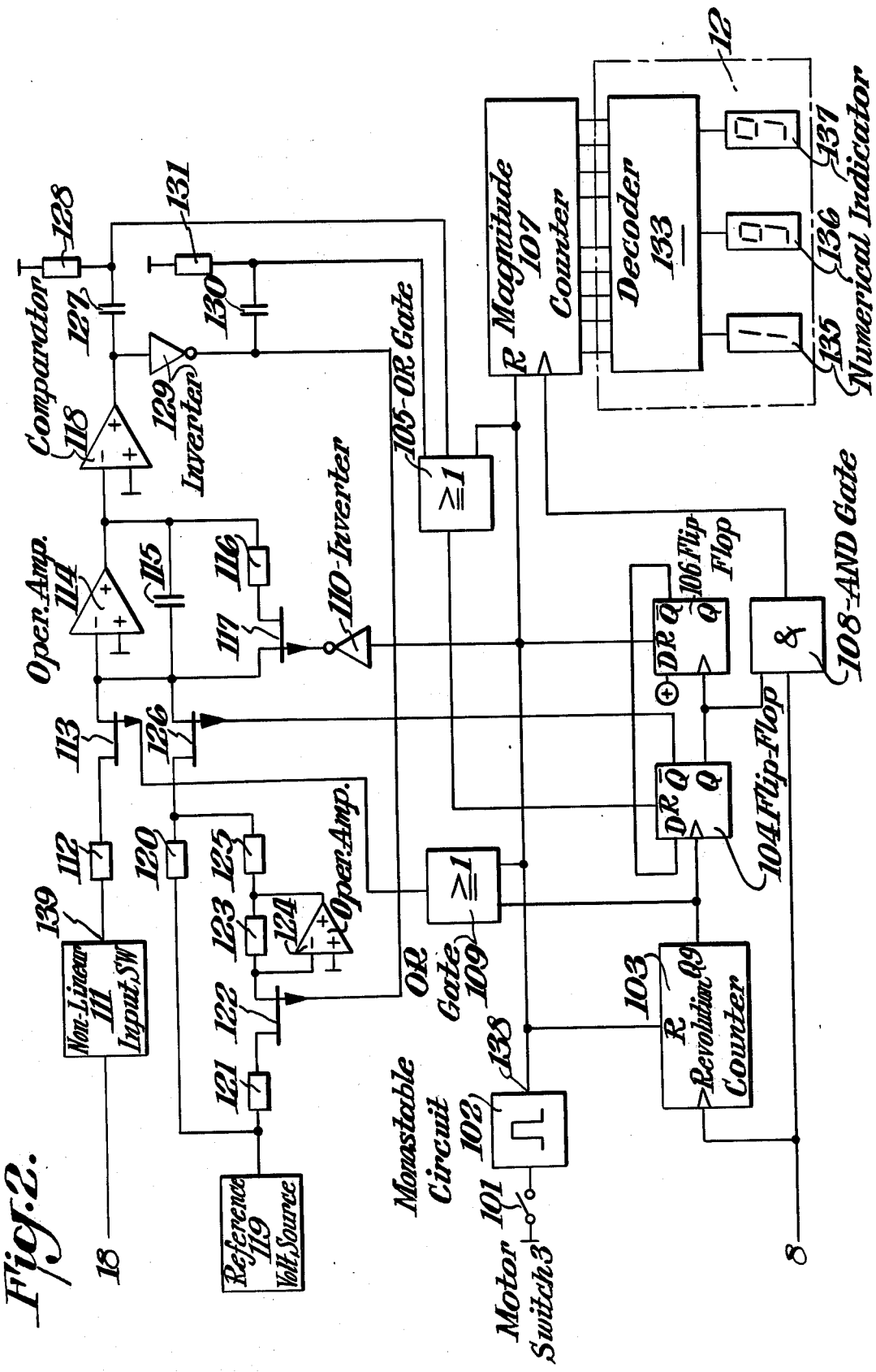
FIG. 2 is a schematic block diagram showing a particularly advantageous embodiment for obtaining a digital readout.

In FIG. 2, a particularly advantageous embodiment of the digital magnitude-measuring unit 10 is explained further.

Simultaneously with the starting of the driving motor 3, a switch 101 is closed and thereby actuates a monostable circuit 102, so that at output 138 thereof a signal is emitted which effects, that during the time the body to be balanced needs to reach the balancing speed the switching apparatus needed for the determination of the unbalance magnitude in digital form takes in a well-defined initial state. Thus, this signal turns on a field effect transistor switch 117 by means of an inverter 110, so that a capacitor 115 may be discharged by means of a resistor 116. Thereby the integrator, consisting of an operational amplifier 114 and capacitor 115, is set to zero. The signal at output 138 also resets a magnitude counter 107 for the unbalance magnitude to zero. Furthermore, by means of this signal, a revolution counter 103 is also cleared by means of a reset input. In addition, the signal originating at output 138 is supplied, for one thing, directly to a flip-flop 106 and, for another, it is joined indirectly to an input of a flip-flop 104 by means of an OR Gate 105. Both flip-flops 104 and 106 are reset thereby.

After the speed up time of the body to be balanced and a certain safety time for stabilization of possible transient processes, the reset signal at output 138 of monostable circuit 102 is ended. By means of an electrical conduit 8, the pulses coming from the increment transmitter may now be accumulated in the revolution counter 103. The output Q9 of revolution counter 103 is chosen in such a manner that at the earliest after the pulses corresponding to one revolution, in the exemplary embodiment 256, a change of information takes place. With the elimination of the reset signal, a switch 113 arranged before the input of the integrator and constructed as a field effect transistor is closed by means of an OR Gate 109, so that now by means of electrical conduit 18 (see FIG. 1) by way of a non-linear input circuit 111 and a resistor 112, the unbalance information may be transmitted further to the integrator, consisting of operational amplifier 114 and capacitor 115, in order to be summarized there. Since the information by way of both electrical conduit 8 and conduit 18 was fed simultaneously, after one revolution at first a signal is present at the output Q9 of the revolution counter which by means of OR Gate 109 opens switch 113, so that no further unbalance information may be fed into the integrator. At the same time, by this pulse emitted by the revolution counter, flip-flop 104 is set, so that by way of output $\overline{Q}$ of this flip-flop, a further switch 126 arranged before the input of the integrator and constructed as a field effect transistor, may be closed, so that a direct current may be supplied from a reference source 119 to the integrator. At the same time, by means of a further output Q of flip-flop 104, an AND Gate 108 is opened, so that by means thereof the increment pulses of electrical conduit 8 may be registered in the unbalance magnitude counter 107. At the output of the integrator, consisting of the operational amplifier 114 and capacitor 115, there is connected a comparator 118 which tests the sign of the accumulated voltage corresponding to the unbalance magnitude. The sign representing output information of comparator 118, by means of an inverter 129, is transmitted further to a switch 122, so that, in the event of a positive intregration sum, it is opened and in the event of a negative integration sum, it remains closed. Switch 122, thus provides the guarantee that the voltage, emitted by the reference voltage source 119, is always supplied to the integrator in such a manner that the previously accumulated voltage regardless of its polarity is reduced linearly to zero. In other words, by means of switch 122, there takes place a polarity reversal of the reference voltage, referring to the input of the integrator 114, 115. With an open switch 122, a positive current reaches solely by means of resistor 120 and closed switch 126 the input of the integrator. With a closed switch 122, a resistor 121, a resistor 123, and an operational amplifier 124 act as an inverter, so that a reversal of the entire current takes place in that the negative current delivered by way of resistor 125 from the output of the inverter is double as great as the positive current delivered solely by way of resistor 120.

If the integrator output voltage becomes zero, comparator 118 reverses so that, depending on the direction of the zero crossing, either directly by way of a differentiating member 127, 128 or indirectly by way of inverter 129 and a differentiating member 130 and 131, the flip-flop 104 is reset by means of the OR Gate 105, so that the AND Gate 108 is closed in order that further meter pulses are no longer transmitted to the magnitude counter 107. Connected to the unbalance magnitude counter 107 is a decoder 133 by means of which the numerical indicators 135, 136, 137, corresponding to the numerical content of counter 107 are controlled.

By setting flip-flop 104 by means of output Q9 of revolution counter 103, flip-flop 106 is also set. By connecting an output of flip-flop 106 with an input of flip-flop 104, it is prevented that further pulses emitted from output Q9 of revolution counter 103 initiate a renewed counting cycle. Only after a renewed turning on of driving motor 3 and thus an actuation of switch 101, this locking condition is terminated.

If indicator 135, 136, 137 is to read out in ounces, grams or centimeters, it is entirely sufficient if the voltage emitted by the reference voltage source 119 is switched in a respective proportion.

If output Q9 of revolution counter 103 is selected in such a manner that it does not switch immediately after the first measuring revolution but rather only after any adjustable number, it is achieved thereby in a simple manner that the measuring sensitivity may be set in proportion to the selected number of revolutions.

The delayless, non-linear input circuit illustrated in FIG. 3, which corresponds to block 111 illustrated in FIG. 2 is particularly advantageously constructed for the vector display of the unbalance magnitude as follows: The unbalance information coming by way of electrical conduit 18 is joined by way of a filter amplifier 201 and a matching resistor 202 to the input of an operational amplifier 204, which has a negative feedback for positive output voltages by means of a diode 206 and a resistor 203, while for negative output voltages it has a direct negative feedback by means of diode 205. It is achieved thereby that from the output 139 of the non-linear input circuit, i.e. at the branching point between diode 26 and resistor 203, only positive voltages may be transmitted. A one-way rectification of the output voltage of the filter amplifier is achieved.

Figure 4:
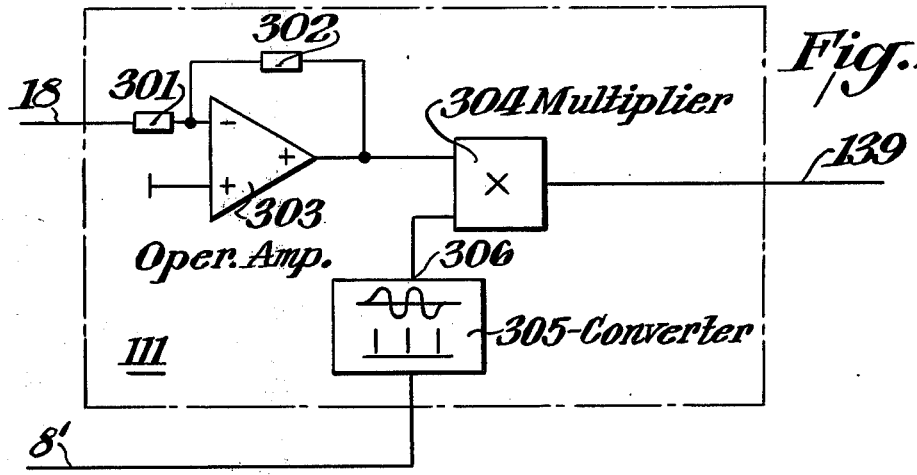

In order to achieve a component display of the unbalance, a supplemental hole on the increment transmitter is scanned delivering one pulse per revolution in a simple manner according to FIG. 4. This information is supplied by way of electrical conduit 8' to the non-linear input circuit 111 and there is converted in a converter 305, in a known manner, to a sine-shaped reference alternating voltage. It is conducted further from output 306 to a multiplier 304 to which is supplied by way of a further input the unbalance information from electrical conduit 118 by way of an amplifier, which consists of a matching resistor 301, an operational amplifier 303 and a resistor 302, switched parallel thereto. At output 139 of the non-linear input circuit, a signal corresponding to a component of the unbalance magnitude is available, which may also be indicated digitally.

The other embodiment of the non-linear input circuit for the determination of the unbalance in components, illustrated in FIG. 5, prepares the angle information, in the same manner as described with reference to FIG. 4, in unit 405, so that at output 406 of unit 405, a square-wave control voltage is available which actuates a switch 404, in such a manner that the unbalance information from electrical conduit 18 is supplied to output 139 of the non-linear input circuit by means of a similarly functioning amplifier, which consists of a matching resistor 401, an operational amplifier 403 and a resistor 402, as described in FIG. 4, and by means of switch 404.

The elements represented by the following reference numerals may, for example, be provided by the indicated components manufactured and sold by suppliers as indicated and identified by the accompanying part number

Figure 3:
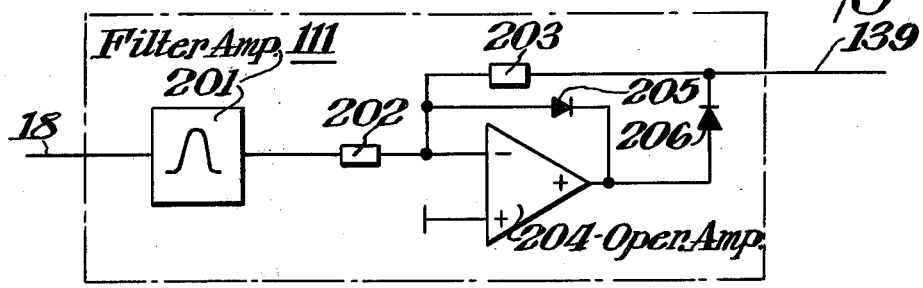
FIG. 3 is a schematic block diagram showing a particularly advantageous development of a delayless, non-linear input circuit for the measurement of the unbalance vector and of the unbalance magnitude, respectively, which is a further embodiment of this invention; and In FIGS. 4 and 5 are shown two still further embodiments of the non-linear input circuit for the measurement of the unbalance in components.
Figure 5:
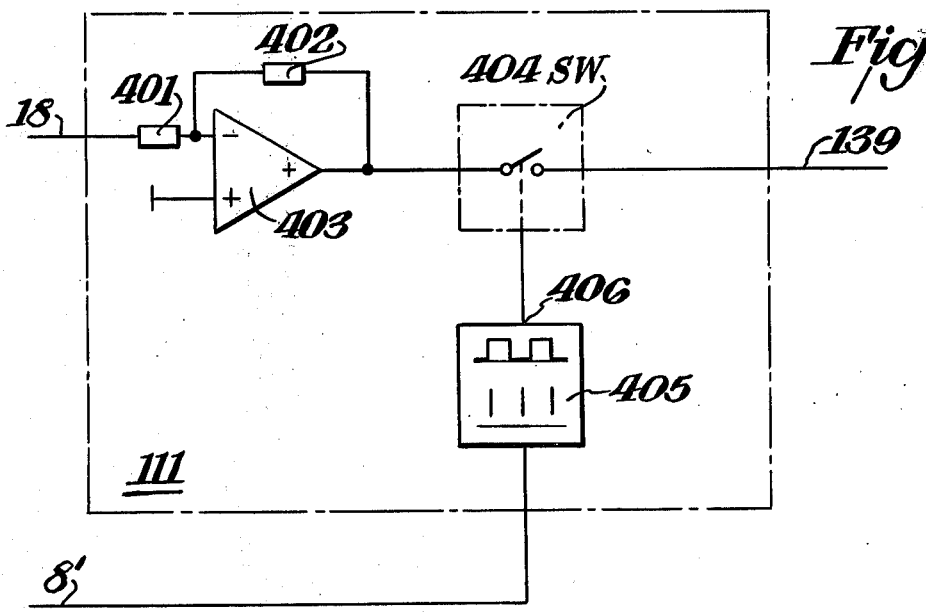

| Reference Numeral | Part & Supplier | |
|---|---|---|
| FIG. 2-111, See FIGS. 3, 4, or 5 | | |
| 112, 120, 121, 123, 125, 116 | Resistors | |
| 121 = 123 (e.g. 10kΩ) | | |
| 120 = 2×125 (e.g. 120 = 10kΩ, 125=5kΩ) | | |
| 113, 117, 122, 126 | Field effect Transistor Switches e.g. 1H5011 (Intersil, Cupertino, California 95014). | |
| 114, 118, 124 | Operational amplifiers, e.g. 741C (Intersil) | |
| 127, 128, 130, 131 | Differentiating Member, e.g. 1nF, 100kΩ. | |
| 110, 129 | Inverters CD 4009 | |
| 105, 109 | OR-Gate CD 4075 | RCA, Somerville, N.J. 08876 |
| 104, 106 | Flip-Flop CD 4013 | |
| 108 | AND Gate CD 4081 | |
| 103 | Counter CD 4040 | |
| 107 | Counter 3x CD 4029 | |
| 133 | Decoder 3x CD 4055 | |
| 135, 136, 137 | Display 3x MAN 1 Monsanto, Palo Alto, Cal. 94304 | |
| 102 | Monostable Circuit NE 555 (Signetics, Sunnyvale, Cal. 94086) | |
| FIG. 4/304 | Multipliers AD532K Analog Devices, Norwood, Mass | |

| Reference Numeral | Part & Supplier |
|---|---|
| | 02062 |
| 305 | Impulse to Sinus-Converter, e.g. U.S. Pat. No. 3,349,257 (Thomas et al), output M in FIG. 1 of U.S. Patent ccorresponds to output 306 of converter 305 |
| FIG. 5/404 | Electronic Switch DG 200 (Siliconix, Santa Clara, California 95054) |
| 405 | Impulse to rectangular wave converter, e.g. U.S. Pat. No. 3,349,257 (Thomas et al) Output K in FIG. 1 of U.S. Patent corresponds to output 406 of converter. |

We claim:

1. A process for the indication in digital form of the extent of unbalance of a body to be balanced in at least one plane in an unbalance measurement on balancing machines, comprising the steps of supplying an alternating voltage corresponding to the unbalance by a switch to an integrator by means of a delayless, non-linear input circuit for at least one revolution of the body to be balanced, after this (these) measuring revolution(s) supplying a reference voltage to the integrator until the integrator output voltage is thereby returned to zero, and during this return time, supplying pulses by an increment transmitter to a counter whose count results represent the extent of the unbalance.

2. The process of claim 1, wherein the reference voltage is changed to effect a calibration of the digital indicator.

3. The process of any of claims 1 or 2, wherein the number of measuring revolution are selected to change the measuring sensitivity in corresponding steps.

4. The process of any of claims 1 or 2 wherein the measurement is filtered and rectified due to the non-linear input circuit.

5. The process of any of claims 1 or 2 for the indication of the unbalance in components, wherein a reference signal is delivered by the angular position transmitter to cause a multiplication of the unbalance signal with a sine-shaped reference signal as a result of the non-linear input circuit.

6. The process of any of claims 1 or 2 for the indication of the unbalance in components, wherein a rectification is carried out, in the non-linear input circuit, controlled by the angular position transmitter.

7. A device for the indication of the imbalance in components with a balancing machine with oscillation transformers, angle position transmitter and a plane separating circuit, characterized in that the signals emanating from the oscillation transformers, separated in the plane separating circuit, a non-linear circuit connected to each of the planes whereby the signals are supplied to the non-linear circuit each, a sole integrator circuit connected to the non-linear circuit whereby their output signals are timely supplied in sequence to the sole integrator, a source of reference voltage connected to the integrator, and the transmitter being connected to a counter for supplying pulses thereto.

8. The device of claim 7, characterized in that the reference voltage source is constructed and arranged to deliver at least two direct voltages, selection and connection means which separately may be connected to selectively supply the pulses to an input of the integrator.

9. A device in accordance with claim 8 characterized in that a switch is connected with several outputs of a revolution counter for determining the number of measuring revolutions.

10. The device of any one of claims 7, 8 or 9 for the indication of the imbalance vector, characterized in that the non-linear input circuit comprise a filter amplifier and a rectifying circuit connected therewith.

11. The device of any one of claims 7, 8 or 9 for the indication of the imbalance in components, characterized in that the non-linear input circuit is a multiplier whose one input has the imbalance signals conducted thereto and whose other input has a sine wave supplied thereto, which is delivered by the angle position transmitter.

12. The device of any one of claims 7, 8 or 9 for the indication of the imbalance in components, characterized in that the non-linear input circuit is an electronic switch which is actuated by the angular position transmitting signal.

* * * * *